(12) United States Patent
Wiesen et al.

(10) Patent No.: US 10,666,747 B2
(45) Date of Patent: *May 26, 2020

(54) PROVIDING CONTENT TO A GEOGRAPHICALLY CONSTRAINED SET OF RECIPIENTS

(71) Applicant: NEXTDOOR.COM, INC., San Francisco, CA (US)

(72) Inventors: David Wiesen, San Francisco, CA (US); Rishi Mukhopadhyay, San Francisco, CA (US); Ryan Sims, San Francisco, CA (US); Paul Howe, Mill Valley, CA (US); Morgan Hallmon, Oakland, CA (US)

(73) Assignee: NEXTDOOR.COM, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/168,025

(22) Filed: Oct. 23, 2018

(65) Prior Publication Data

US 2019/0068727 A1 Feb. 28, 2019

Related U.S. Application Data

(63) Continuation of application No. 14/644,112, filed on Mar. 10, 2015, now Pat. No. 10,129,345.
(Continued)

(51) Int. Cl.
*H04L 29/08* (2006.01)
*H04W 4/021* (2018.01)
(Continued)

(52) U.S. Cl.
CPC ........ *H04L 67/18* (2013.01); *G06Q 30/0261* (2013.01); *G06Q 50/01* (2013.01);
(Continued)

(58) Field of Classification Search
CPC ........ H04W 4/08; H04W 4/021; G06Q 50/26; G06Q 50/01; G06Q 30/0261; H04L 67/18
See application file for complete search history.

(56) References Cited

U.S. PATENT DOCUMENTS

2006/0047429 A1* 3/2006 Adams ............... G01V 1/30
702/6
2007/0208683 A1 9/2007 Geilich
(Continued)

OTHER PUBLICATIONS

Wiesen, U.S. Appl. No. 14/644,112, filed Mar. 10, 2015, Advisory Action, dated May 10, 2018.
(Continued)

*Primary Examiner* — Mandish K Randhawa
(74) *Attorney, Agent, or Firm* — Hickman Palermo Becker Bingham LLP (57) ABSTRACT

Users of social networking computer systems provide location information that is transformed into geo-coded coordinates specifying user locations. Providers of content, such as messages or documents, also participate in the social networking system and use drawing tools or provide data files that define one or more geographical areas or regions of a map, which may define a larger geographical area that encompasses the users of the social networking system. Data specifying the areas is stored. The content providers create one or more messages and associate each of the one or more messages with one or more of the areas. The users communicate requests for messages to the social networking system; in response, the system associates the user location data with the stored areas and messages and returns only those messages that have been associated with the particular areas in which the users are located. As a result, users receive only messages for their areas, and only messages that the content providers have designated as intended for or relevant to their areas.

16 Claims, 7 Drawing Sheets

Related U.S. Application Data (60) Provisional application No. 61/950,935, filed on Mar. 11, 2014.

(51) Int. Cl.
  *H04W 4/08* (2009.01)
  *G06Q 50/00* (2012.01)
  *G06Q 50/26* (2012.01)
  *G06Q 30/02* (2012.01)

(52) U.S. Cl.
  CPC ............ *G06Q 50/26* (2013.01); *H04W 4/021* (2013.01); *H04W 4/08* (2013.01)

(56) References Cited

U.S. PATENT DOCUMENTS

| | | |
|---|---|---|
| 2009/0248828 A1 | 10/2009 | Gould |
| 2010/0082671 A1 | 4/2010 | Li |
| 2010/0250777 A1 | 9/2010 | Morris |
| 2011/0059748 A1 | 3/2011 | Taylor |
| 2011/0276592 A1 | 11/2011 | Gautama et al. |
| 2011/0320319 A1* | 12/2011 | Streich ................. G06Q 30/06 705/27.1 |
| 2012/0089594 A1 | 1/2012 | Krishna et al. |
| 2012/0225672 A1 | 9/2012 | Tholkes et al. |
| 2015/0161719 A1 | 6/2015 | Abhyanker |
| 2015/0264143 A1 | 9/2015 | Wiesen et al. |

OTHER PUBLICATIONS

Wiesen, U.S. Appl. No. 14/644,112, filed Mar. 10, 2018, Notice of Allowability, dated Jul. 13, 2018.

Wiesen, U.S. Appl. No. 14/644,112, filed Mar. 10, 2015, Office Action, dated Jun. 26, 2017.

Wiesen, U.S. Appl. No. 14/644,112, filed Mar. 10, 2015, Notice of Allowance, dated Jul. 13, 2018.

Wiesen, U.S. Appl. No. 14/644,112, filed Mar. 10, 2015, Final Office Action, dated Feb. 5, 2018.

Wiesen, U.S. Appl. No. 14/644,112, filed Mar. 10, 2015, Final Office Action, dated Jan. 23, 2017.

Wiesen, U.S. Appl. No. 14/644,112, filed Mar. 10, 2015, Advisory Action, dated Apr. 12, 2017.

U.S. Appl. No. 14/644,112, filed Mar. 10, 2015, Office Action, dated Jul. 1, 2016.

International Searching Authority, "Search Report" in application No. PCT/US15/19885, dated Jun. 29, 2015, 11 pages.

Claims in application No. PCT/US15/19885, dated Jun. 2015, 5 pages.

* cited by examiner

PROVIDING CONTENT TO A GEOGRAPHICALLY CONSTRAINED SET OF RECIPIENTS

BENEFIT CLAIM

This application claims the benefit under 35 U.S.C. § 120 as a continuation of application Ser. No. 14/644,112, filed Mar. 10, 2015, which claims the benefit under 35 U.S.C. 119(e) of provisional application 61/950,935, filed Mar. 11, 2014, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to electronic communication of information from a creator of the information to a group of recipients. The disclosure relates more specifically to providing information from municipal officials to private citizens, and to systems and methods for selectively communicating information to recipients within a particular geographic area.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer users increasingly turn to networked social media computing systems for relevant information from municipal officials such as police officers, firemen, mayors, city council members, leaders or administrators in municipal departments or services agencies, and others. Geographic proximity is typically important to the overall relevance of information that is sent.

To date, social media tools have provided little more than large broadcast channels for these types of senders, allowing them to aggregate all information into a single monolithic feed. For example, a mayor might have a website, social media page, or content feed that is public, or available to anyone who subscribes. However, not all the information that a particular sender communicates is always relevant to every user. Users may be presented with large amounts of information with extremely low relevance, such as a notice for a street closure on the other side of town, or a burglary that occurred 15 miles away. There is a need for improved computer-based systems and methods to allow municipal officials to narrowcast information to a geographically constrained set of recipients for whom it is relevant.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, users of social networking computer systems provide location information that is transformed into geo-coded coordinates specifying user locations. "Users," in this context, refers broadly to individuals, user accounts, and/or user computing devices such as desktop computers, workstations, laptop computers, tablet computers, smartphones or other mobile computing devices. Providers of content, such as messages or documents, also participate in the social networking system with other computers, and use computer-implemented drawing tools or provide data files that define one or more geographical areas or regions of a map, which may define a larger geographical area that encompasses the users of the social networking system. Data defining and specifying the areas is digitally stored in storage systems of the social networking system.

The content providers create one or more messages and associate each of the one or more messages with one or more of the areas, using client computers accessible to the content providers. End users communicate requests for messages to the social networking system; in response, the system associates the user location data with the stored areas and messages, and returns only those messages that have been associated with the particular areas in which the users are located. As a result, users receive only messages for their areas, and only messages that the content providers have designated as intended for or relevant to their areas.

In various embodiments, computer-based systems and methods are provided for enabling municipal officials to selectively narrowcast information to a geographically constrained set of recipients. "Official," in this context, refers to any authorized person associated with a "municipality," as used herein, and need not be an elected person but may be an administrator, employee, intern or other authorized party, or the user account or end user computing device of that party. In one embodiment, a computer-implemented method comprises (1) grouping users into geographic areas based on coding of location information which they provide, (2)

allowing municipal officials to define geographic narrowcast areas and boundaries, (3) associating users' geographic location with a specific narrowcast area, (4) enabling municipal officials to target messages to sets of narrowcast areas, (5) delivering messages via a social network, mobile application, text message or other form to users within the selected narrowcast area. The term "message," in this context, refers to information content that is capable of storing in electronic digital data storage, and human readable in any form, including but not limited to e-mail messages, text messages, electronic documents or files, Web pages, and the like.

Various embodiments make it possible for municipal officials to provide messages to users based on their geography. Example applications include allowing police to provide custom messages citizens within their beats, allowing council members to communicate directly with their constituents, and allowing emergency services to notify residents of a natural disaster among other things.

Certain embodiments are described herein in the context of municipal officials creating and providing messages to citizens or residents of a city. However, embodiments may be used in any context in which a creator of information provides a communication to a set of recipients who are within, or associated with, a geographically constrained region or area, and municipal use is not required. For example, providers could be any of: commercial entities who wish to contact only customers that are within a particular state, county, city or other region; religious entities who wish to contact members who are located within a particular state, city, bishopric, diocese, or other administrative region that is geography-based; or individual end users who wish to contact only friends, neighbors or other users who are within a particular country, state, county, city, neighborhood or other region.

In one embodiment, a data processing method comprises using a server computer, receiving location information indicating a geographic location of a first end user computing device that is associated with a resident of a municipality and a first user account and storing the location information in association with a user account identifier; using the server computer, digitally grouping each user account among a plurality of user accounts into a particular geographic area among a plurality of different geographic areas based upon the location information; using the server computer, receiving from a second end user computing device that is associated with a municipal official, digital data that defines a plurality of geographic areas and storing the digital data; using the server computer, creating and storing digital data records that associate the location information of the first user account and a subset of the plurality of other user accounts with one or more particular geographic areas among the plurality of geographic areas; receiving, using the server computer, from the second end user computing device, a message and an identifier of the one or more particular geographic areas; using the server computer, causing delivering the message only to the first user account and all other user accounts in the subset that have been associated with the one or more particular geographic areas.

In another embodiment, a data processing method comprises using a server computer, receiving location information indicating a geographic location of a first end user computing device that is associated with a resident of a municipality and a first user account and storing the location information in association with a user account identifier; using the server computer, digitally grouping each user account among a plurality of user accounts into a particular geographic area among a plurality of different geographic areas based upon the location information; using the server computer, receiving from a second end user computing device that is associated with a municipal official, digital data that defines a plurality of geographic areas and storing the digital data; using the server computer, creating and storing digital data records that associate the location information of the first user account and a subset of the plurality of other user accounts with one or more particular geographic areas among the plurality of geographic areas; receiving, using the server computer, from the second end user computing device, a message and an identifier of two disjoint particular geographic areas; in response to receiving the message and the identifier of the two disjoint particular geographic areas, determining a particular set of user accounts that are associated with the two disjoint particular geographic areas; using the server computer, causing delivering the message only to the first user account and all other user accounts in the particular set that have been associated with the two disjoint particular geographic areas via any one of a social networking system, a mobile application or a text message; using the server computer: storing, in a user geo database, first records that associate user account identifiers to the location information; storing, in a municipal areas database, second records that associate geographic areas with sets of coordinates that define the geographic areas; storing, in a message/content database, third records that associate a plurality of different messages to a respective plurality of sets of one or more particular geographic areas; using the user geo database, the municipal areas database, and the message/content database for the storing steps, including performing a database join of the user geo database and the municipal areas database as part of determining the particular set of user accounts.

In an embodiment, a computer system comprises a front-end interface that is programmed to receive location information indicating a geographic location of a first end user computing device that is associated with a resident of a municipality and a first user account and to store the location information in a user geo database; an association engine that is programmed to digitally group each user account among a plurality of user accounts into a particular geographic area among a plurality of different geographic areas based upon the location information, to receive from a second end user computing device that is associated with a municipal official, digital data that defines a plurality of geographic areas and to store the digital data in a municipal areas database, and to create and store digital data records that associate the location information of the first user account and a subset of the plurality of other user accounts with one particular geographic area among the plurality of geographic areas; a content engine that is programmed to receive, from the second end user computing device, a message and an identifier of the one particular geographic area, to store the message and identifier in a message/content database, and to cause delivering the message only to the first user account and all other user accounts in the subset that have been associated with the one particular geographic area.

Other embodiments and aspects of the invention will be apparent from the description, drawings and claims that form the whole of this disclosure.

2. Overview of Example Embodiment

Figure 1:
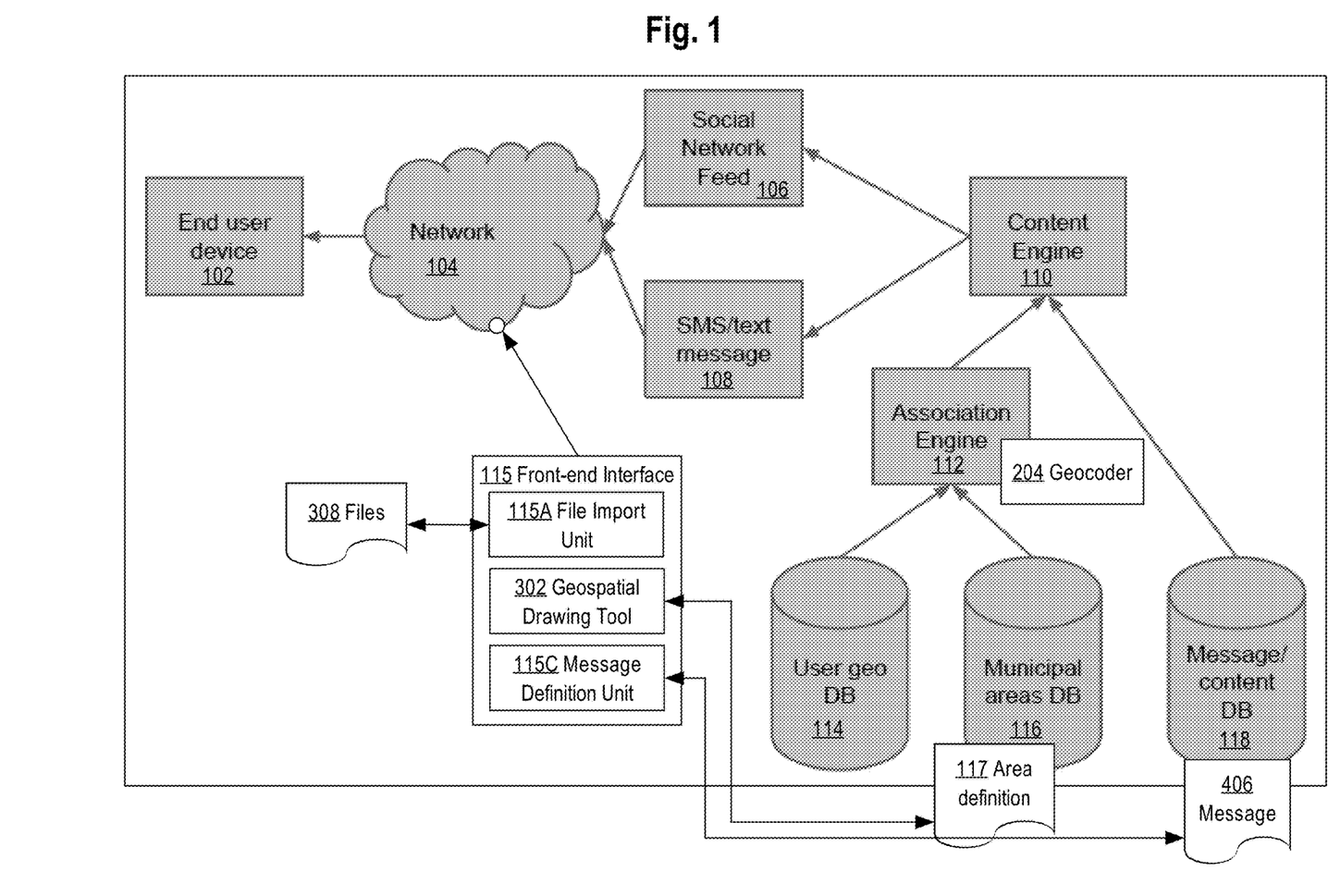
FIG. 1 illustrates an example networked geographic narrowcasting computer system.

FIG. 1 illustrates an example computer-implemented geographic narrowcasting system.

In one embodiment, an end user device 102 is coupled to a network 104. End user device 102 may be any computing device that is useful to an end user, including but not limited to a personal computer, workstation, laptop computer, netbook computer, ultrabook computer, tablet computer, smartphone, or other computing device. End user device 102 typically hosts or executes an interne browser that is configured to request, render and cause displaying web pages or other HTML content via HTTP over network 104, and other elements of the system that are described herein may provide messages or other content to end user device 102 using HTML or other web-related content. Additionally or alternatively, end user device 102 may obtain and host or execute a special-purpose computer program application or "app" that is configured to receive and display content on particular kinds of devices, such as smartphones or tablets. In any such embodiment, end user device 102 may be configured to receive data via a social network feed 106 and/or SMS/text message 108, as further described.

Multiple different end user devices 102 may be used by multiple different types of end users. In one embodiment, a municipal official is one type of end user, and a resident of a municipality is a second type of end user.

The system of FIG. 1 further comprises a computer, such as a server computer, that hosts or executes a content engine 110, association engine 112, and front-end interface 115; the server computer also hosts or executes, or is communicatively coupled to, a user geo database 114, municipal areas database 116, and message/content database 118. As seen in FIG. 1, the foregoing elements may be hosted in separate computers or may be within a single computer. The server computer referenced above may be a single physical machine, multiple cores, processors or machines, or one or more virtual machine instances.

The content engine 110 is programmed or configured to generate and deliver content via the social network feed 106 and/or SMS/text message 108. In an embodiment, content engine 110 is coupled to an association engine 112, which is in turn coupled to a user geo database 114, municipal areas database 116, and message/content database 118. The content engine 110 may be configured to deliver geographically targeted messages to correct users via social network feed 106 and SMS messaging service 108.

For purposes of illustrating a clear example, FIG. 1 illustrates a single end user device 102, content engine 110, and certain other elements. In other embodiments, any number of such elements may be used. For example, embodiments may use thousands or millions of end user devices 102 and there may be any number of instances of content engine 110, association engine 112, the databases, and other elements hosted in any number of physical computers, virtual machine instances and the like in local enterprise-controlled datacenters or cloud-based datacenters. Thus FIG. 1 is representative of a system that may be scaled up to accommodate many thousands or millions of users and user devices.

In one embodiment, association engine 112 comprises a geographic coder or geocoder 204 that is configured to translate user information such as an address, mobile phone number or IP into digital data representing a geographic location, as further described herein. The user geo database 114 is configured to electronically store records representing geographic locations for end user device 102 and/or other users which are registered in the system.

In an embodiment, the system further comprises a front-end interface 115 having a file import unit 115A, geospatial drawing tool 302, and message definition unit 115C. The file import unit 115A may be configured to receive definitions of geographic areas from files 308 such as groups of pairs of lat-long values that collectively define a polygonal region of a map. The geospatial drawing tool 302 may be configured to allow municipal officials to define geographic areas by drawing points on a map and connecting the points with lines to specify polygons. The polygons may represent one or more particular regions or areas on the map and may be stored in the municipal areas database 116 as one or more area definitions 117. The message definition unit 115C may comprise a Web-based input tool, which may be configured for creating messages 406 in the message/content database 118 and associating the messages with one or more of the area definitions 117 in municipal areas database 116.

In this arrangement, association engine 112 and content engine 110 may cooperate with the databases 114, 116, 118 to provide a computer-based system for enabling municipal officials to selectively narrowcast information to a geographically constrained set of recipients.

Each of the content engine 110, association engine 112, and front-end interface 115 may be implemented using one or more computer programs, other software elements, or other functional logic in firmware or hardware form and programmed or configured to perform the functions that are further described herein. Each of the databases 114, 116, 118 may be implemented using electronic digital storage systems using stand-alone storage devices or disk drives, network attached storage, storage area networks or other forms of digital storage. The databases may be implemented logically using one or more relational database systems, instances or tenants with one or more tables according to a specified schema.

Figure 2:
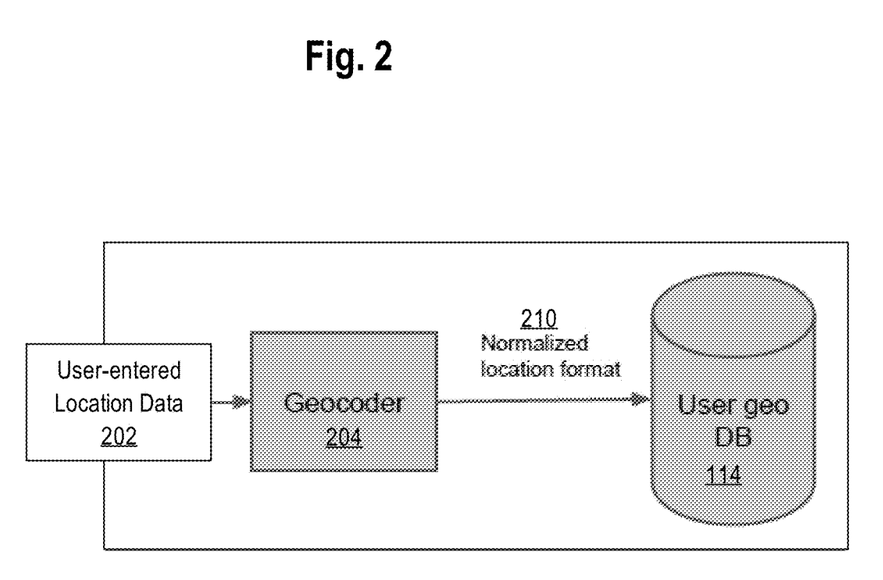
FIG. 2 illustrates data flows in computer elements to achieve user location geocoding.

In use, the system of FIG. 1 may be configured or programmed to bind data describing users to specific geographic locations. FIG. 2 illustrates an example of data flows that may achieve user location geocoding. The geocoding of a user location may be achieved in a number of ways in different implementations. Examples that can be used in various embodiments include obtaining, receiving or entering a physical address, entering a phone number, entering a ZIP code, or entering a latitude and longitude (lat-long) tuple of values. Thus, user-entered location data from an end user device 102 could comprise any of an address ("123 Main Street"), a phone number, a ZIP code, or lat-long values.

Using any of these techniques, user-entered location data 202 is received at the geocoder 204, which is configured or programmed to generate user geo data 210 in a normalized location format and to provide the user geo data to the user geo database 114. Any convenient normalized location format may be used; for example, the normalized location format may comprise pairs of lat-long values, normalized postal addresses, or other forms of values. The particular normalized user location data format is not critical and is intended to provide consistency so that it may be understood throughout the rest of the system. The location data may be used in later steps to associate a user with a particular municipal area.

In an embodiment, operation or use of the system also comprises municipal officials digitally defining one or more narrowcast areas or boundaries prior to providing messages to end users. In various embodiments, boundaries may be created using end user computers with a geospatial drawing tool and by file import.

Figure 3:
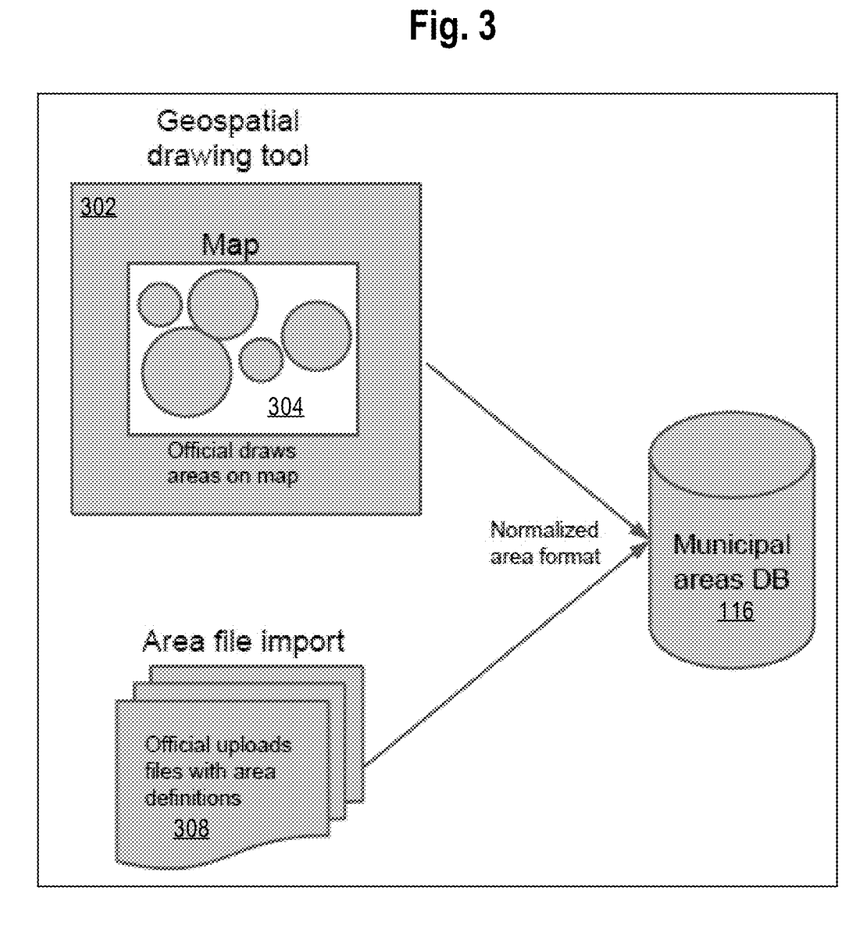
FIG. 3 illustrates data flows in an example of creating municipal areas using networked computing elements.

FIG. 3 illustrates data flows in an example of creating municipal areas. In an embodiment, an end user device 102 hosts or connects to a geospatial drawing tool 302 via front-end interface 115 of the system of FIG. 1. Typically the geospatial drawing tool 302 is accessed using the end user device 102 of a municipal official or administrator, or other user who is authorized to define municipal user groups and messages. The geospatial drawing tool 302 may be programmed or configured as a part of the front-end interface 115, as seen in FIG. 1, so that data and communications using the geospatial drawing tool 302 are logically closely coupled to the other elements of FIG. 1.

The geospatial drawing tool 302 is programmed or configured to display a geographic map 304 and to receive input representing drawing shapes on the map to define the region for a narrowcast of text messages, social network posts, or other content. For example, geospatial drawing tool 302 may receive input in the form of selection of points, dragging gestures indicating lines, selection of polygons, or other operations that collectively indicate a particular map region, sub region or other geographic area. In an embodiment, multiple areas may be defined using the geospatial drawing tool 302. For example, support for defining overlapping areas, subsets of areas and nearly any arbitrary shape definition may be programmed as functions of the geospatial drawing tool 302. Thus, complex shapes such as police beats, water districts and other municipal service areas may be drawn. In addition to defining shapes by drawing, shapes may be defined via importing or uploading data files 308, which may define complex shapes.

Using these techniques, nearly any municipal area boundary may be created. In an embodiment, after a boundary of a geographic region or other municipal area is defined, the region or area may be assigned a name, and digital data representing the region or area is persistently stored in the municipal areas database 116 in association with the name. The database 116 may internally assign a unique area identifier to each new area as the new area is stored in the database. The database 116 is configured to accept queries by the name of the region or area, or unique area identifier, and to return a set of digital data representing that region or area as a result set.

The particular mechanism for defining a geographical region is not critical. What is important is that an official, administrator or other authorized user account can access programs, logic or other computing elements that permit defining a specified geographic region for a narrowcast of text messages, social network posts, or other content.

In an embodiment, digital data specifying each shape is electronically digitally stored in a table of the municipal areas database 116. In an embodiment, database 116 stores data defining a shape in a normalized format, as indicated in FIG. 3, which allows a shape to be compared with other shapes for determining intersections, equality, subordination and/or other relationships. For example, database 116 may store data defining a shape as a set of 3 to N pairs of values, where each pair is a lat-long pair specifying a next successive vertex of a polygon. Flag values or other data may indicate whether a particular vertex is continuously joined to a prior vertex or represents a discontinuity.

Once geographical regions for narrowcast areas have been defined, an end user device 102 may begin targeting content to one or more areas. Content targeting may be performed, in an embodiment, using the front-end interface 115, or a web application that provides tools for content creation, selecting a specified geographic region and directing content only to other users within that region. A website portion of the system of FIG. 1 may be used. In an embodiment, the front-end interface 115 provides web-based forms or tools that are programmed or configured to implement the foregoing functions.

Figure 4:
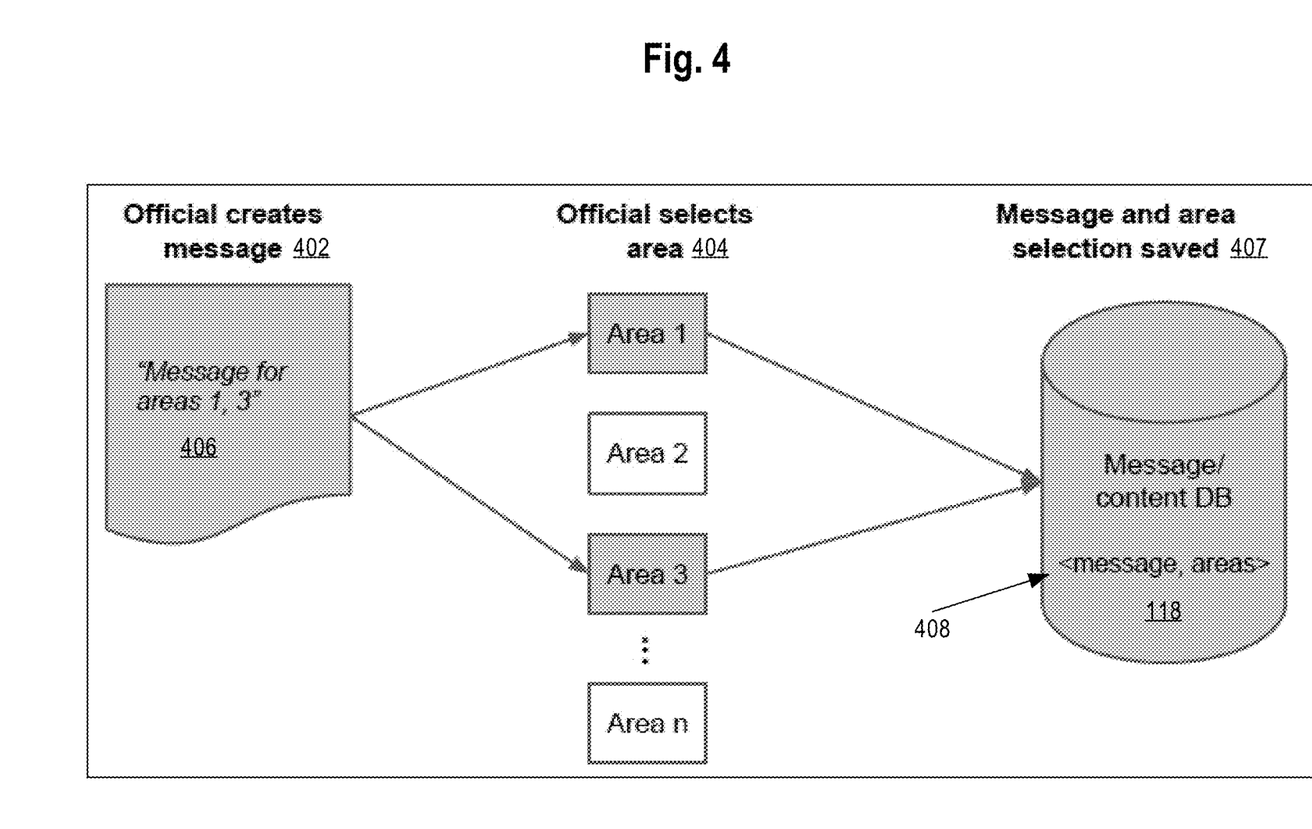
FIG. 4 illustrates data flows in an example of how content may be assigned to a geographic area and saved into database.

FIG. 4 illustrates data flows in an example of how content may be assigned to a geographic area and saved into database.

In one operation, as shown by operation 402, a user such as an official may construct a message 406. For example, the message could be a crime alert, a notice about a meeting, a reminder about a law, rule or policy, a request for input on a new regulation, or any other content that a provider may wish to distribute to a set of users who are within a constrained geographic area. The message may be typed or tapped using an end user device 102 accessible to the official or other user and may be entered into a form or data input field of a web page that implements a social networking service. For example, the NEXTDOOR service, commercially available from Nextdoor.com, Inc., San Francisco, Calif., may be used to enter content.

In an embodiment, at operation 404, an official selects one of the previously defined or named geographical shapes or regions for targeting. For example, the official may use an end user device 102 to select Area 1, which might represent one neighborhood, and Area 3, which might represent a different neighborhood, but not Area 2 and/or Area n.

In an embodiment, at operation 407, the message and data representing the selected areas is saved in a record 408 in the message/content database 118. The data representing the selected areas may comprise a list of names, area numbers, or other unique area identifiers. Thus, when the message is submitted, the content is saved along with the targeted municipal areas in the content database.

Figure 5:
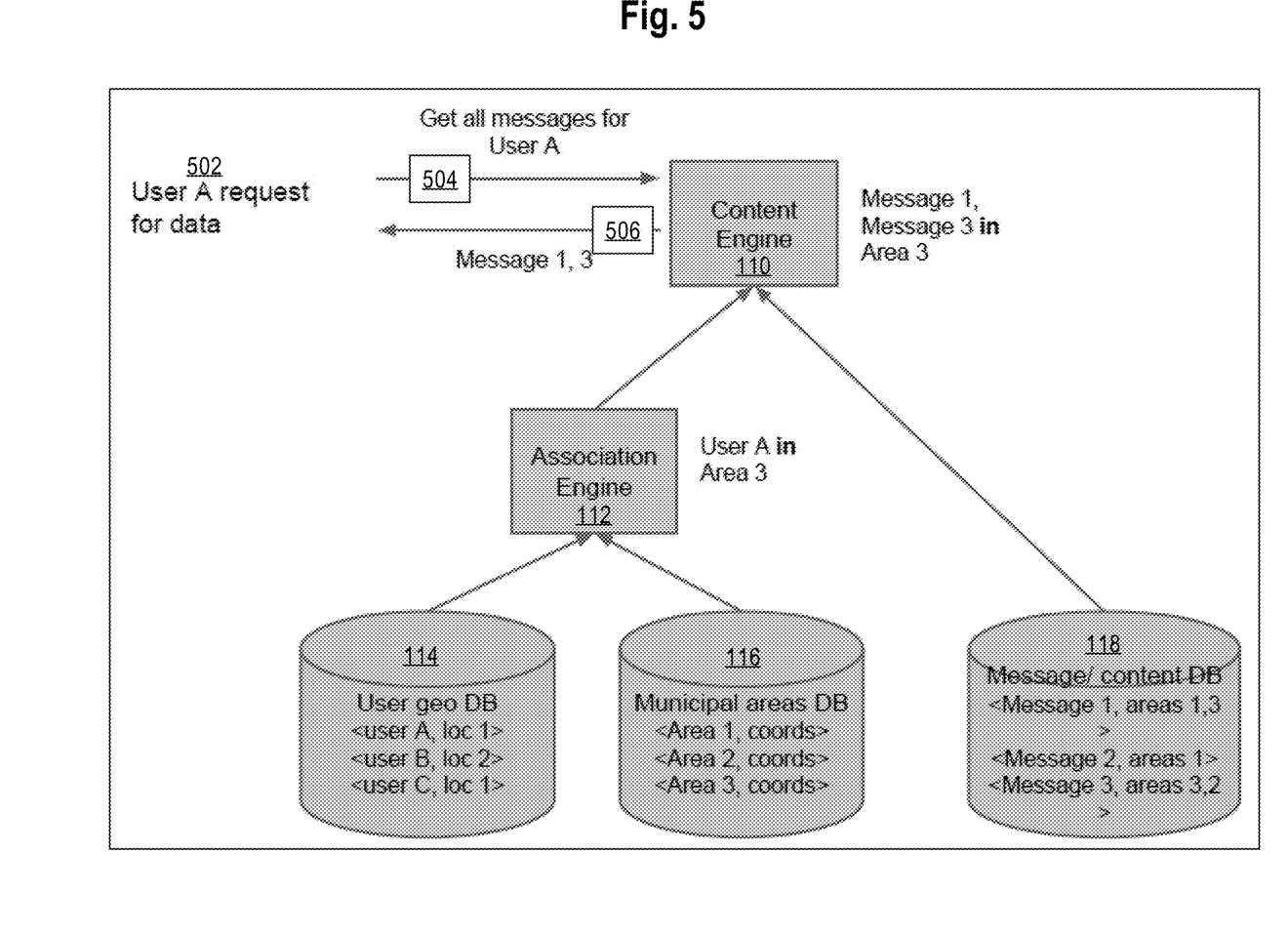
FIG. 5 illustrates data flows in an example retrieval process in which users are associated with geographic areas and content filtered accordingly.

Geographic targeting of messages may be achieved in an embodiment when a user makes a request for content. FIG. 5 illustrates an example retrieval process in which users are associated with geographic areas and content filtered accordingly. At operation 502, a particular user denoted User A requests the system to provide data that is directed to that user. Operation 502 may include a request 504 to obtain all messages that are in the system and directed to User A. This could be a request made directly by the user's browser when logging into the website or it could be a request generated on the user's behalf to generate an urgent text message or a request made from the user's mobile application.

When the request is made, the system attempts to find all messages for the particular user. In one embodiment, association engine 112 determines one or more areas to which a user belongs by matching the normalized location data for the user with each area that has been defined in the system; if the normalized location data is within a defined region, then the user lives in or is otherwise located in that location. The matching process may be performed by executing a run-time geospatial query that determines what areas contain the user's location. Alternatively, the matching process may involve pre-computing the relationships between users and areas prior to the request for content.

In an embodiment, content engine 110 then extracts one or messages from the message/content database 118 and compares those messages to the result data from the association engine 112. Only messages matching the areas returned by the association engine 112 are returned. In an embodiment, the system causes displaying the data to the user at end user device 112; in the case of SMS, the matching messages may be delivered to the end user device 112 using SMS text or media messaging infrastructure.

Figure 6A:
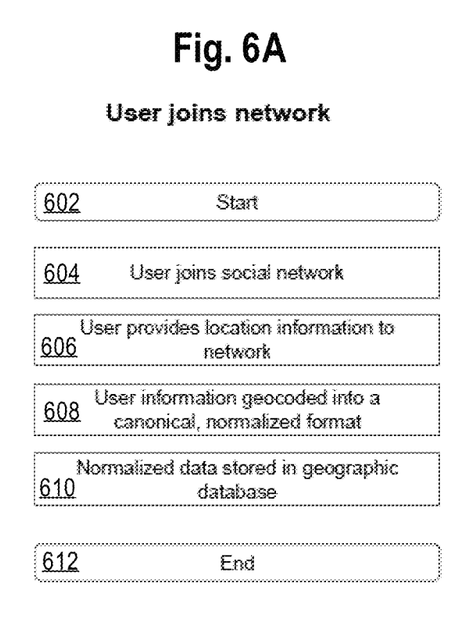
FIG. 6A, FIG. 6B, FIG. 6C illustrate example computer-implemented processes for publishing content to a geographic region and retrieval by a geographically constrained set of recipients.
Figure 6B:
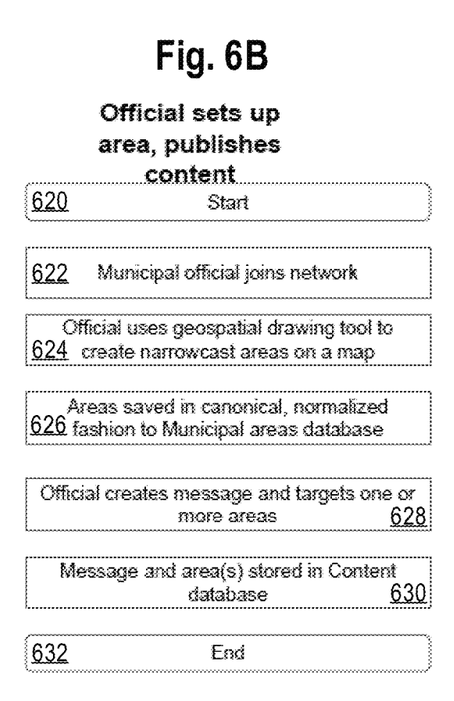
Figure 6C:
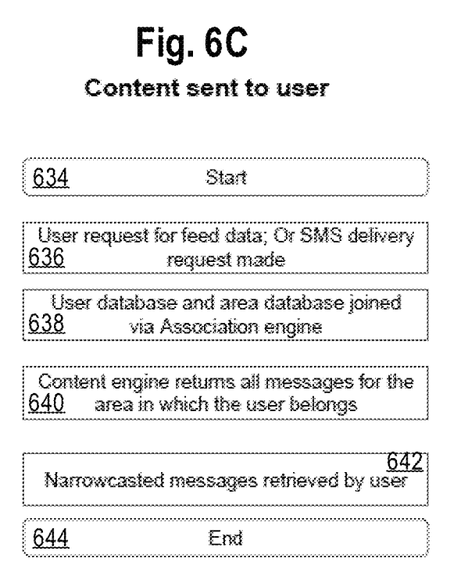

FIG. 6A, FIG. 6B, FIG. 6C illustrate example processes for publishing content to a geographic region and retrieval by a geographically constrained set of recipients.

Referring first to FIG. 6A, a process of a user joining a network is shown. At operation 602, the process starts. At operation 604, the user joins a social network. An example of a location-oriented social network is NEXTDOOR, commercially available from Nextdoor.com, Inc., San Francisco, Calif. At operation 606, the user provides location information to the network; location information may comprise, for example, a street address of a residence or business.

At operation 608, the user information is geocoded into a canonical, normalized format. For example, operation 608 may involve using third party address normalization and transformation tools, accessible using web-based API calls or RESTful calls, to transform user location data into a normalized postal address, then to a pair of latitude and longitude (lat-long) values that specify a geo-location that is at or near the address that the user specified. The lat-long data also may be further normalized, for example, by packing the data into a programmatic object having specified attribute values. At operation 610, the normalized data is stored in a geographic database and operation 612 indicates completing the process.

FIG. 6B illustrates a process of an official setting up an area and publishing content. The process starts at operation 620, and at operation 622 a municipal official joins the social network in which the user has joined (FIG. 6A). At operation 624, the official uses the geospatial drawing tool (FIG. 3) to create one or more narrowcast areas on a map. At operation 626, the areas are saved in a canonical, normalized format in the municipal areas database.

At operation 626, the official creates a messages and targets one or more areas. At operation 630, the message and areas are stored in the content database. Operation 632 indicates an end of the process.

FIG. 6C illustrates a process that may be used when content is sent to a user. The process starts at operation 634. At operation 636, a user request for feed data, or for delivery of SMS messages, is received or made. At operation 638, the user database and area database are joined using the association engine. At operation 640, the content engine returns all messages for the area in which the user belongs. At operation 642, one or more narrowcasted messages are retrieved by the user and the process ends at operation 644.

As an example, referring again to FIG. 5, assume that user geo database 114 stores records indicating that User A is at location 1, User B is at location 2, and User C is at location 1. Assume also that municipal areas database 116 stores records indicating that Area 1 is defined by a first set of geographic coordinates, Area 2 is defined by a second set of coordinates, and Area 3 is defined by a third set of coordinates. Assume further that an official or other user has created in the message/content database 118 a Message 1 directed to Area 1, 3; Message 2 for Area 1; and Message 3 for areas 3, 2. In response to the request of User A at operation 502, 504, the association engine 112 compares data for User A in database 114 and the areas defined in database 116, and determines that User A is in Area 3. All such values are persistently stored electronically as digital data in the specified databases.

In operation, the content engine 110 is programmed to obtain the association of User A to Area 3 from the association engine 112, and to query database 118 to request all messages for Area 3 and obtains Message 1, Message 3 as result data. In response to the user request, the content engine 110 provides as a result set Message 1, Message 3 as seen at operation 506. Providing the messages may include returning text messages or providing Web content.

The embodiments described herein provide numerous benefits over prior approaches. For example, users of social networking systems do not need to receive or review content that is not relevant to them, based upon geography. Moreover, data storage in end user devices 102 is greatly reduced, and network bandwidth is used far more efficiently because the computers shown in this disclosure are programmed not to send messages to end user devices that are not within a geographic area that is relevant to a particular electronic communication. The efficiency of computers used by the content providers is improved because messages or other content do not need to be broadcast to a mass of end users for whom the content is not relevant; instead, end users retrieve or obtain only previously created messages that are relevant to those end users.

Indeed, by using a pulled-data model as illustrated in FIG. 5, in an embodiment, broadcasting is not required at all and end users may obtain relevant messages at a convenient time and without having to receive, store or read non-relevant messages. Still another benefit is that the provider is not required to perform a message sending operation and then check whether sending occurred successfully; instead, messages designated for specified areas are created and stored in the message/content database 118 and then delivered to requesting users who are within those specified areas upon demand.

3. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
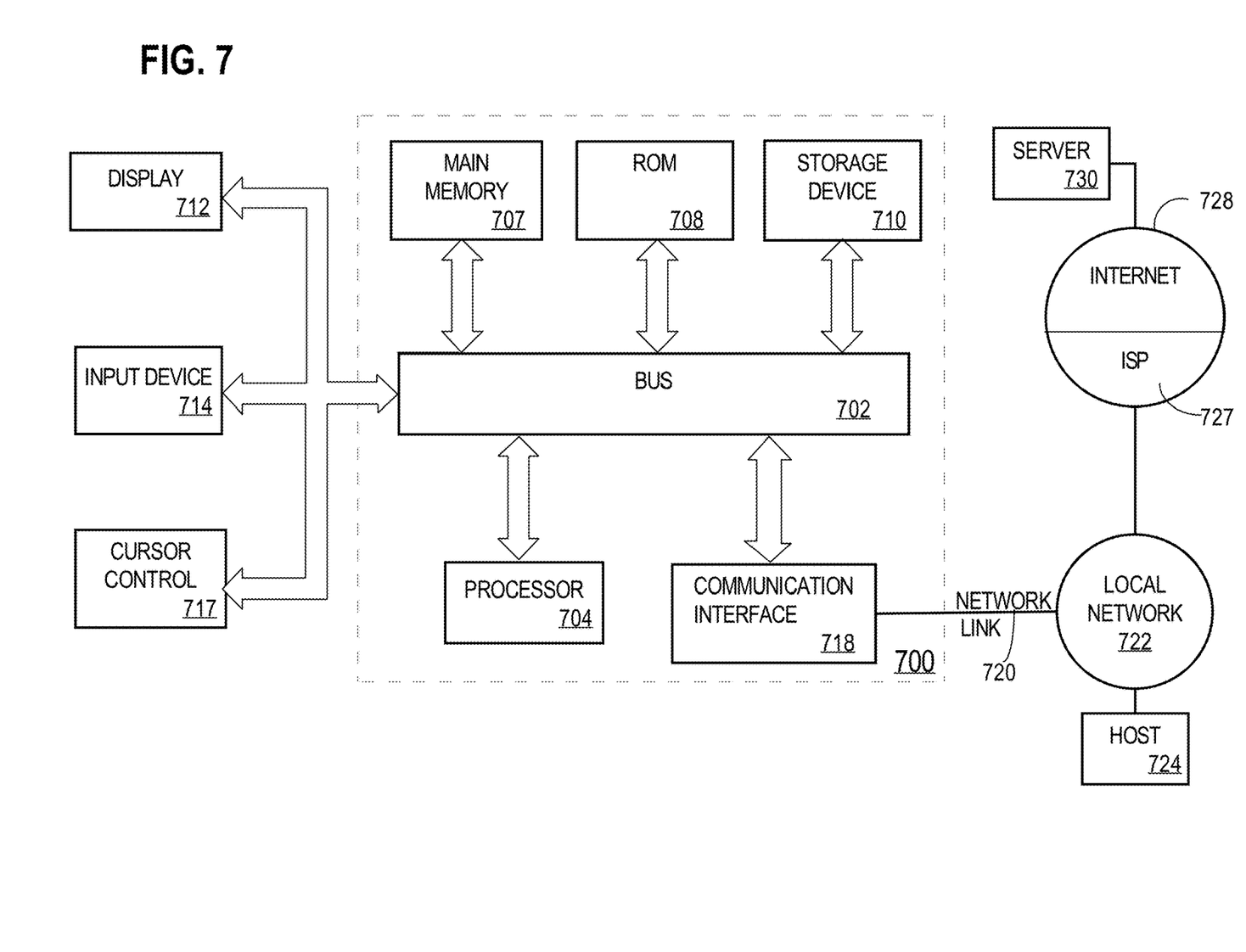
FIG. 7 illustrates an example computer system with which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

4. Extensions, Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
   using computer storage, storing first records that associate user accounts with location information indicating, for each user account, a geographic location associated with the user account;
   receiving, from one or more municipal official computing devices, digital data that defines a plurality of municipal areas;
   in response to receiving the digital data, creating and storing second records that associate municipal area identifiers with sets of latitude/longitude values;

receiving, from the one or more municipal official computing devices, a plurality of messages and, for each message of the plurality of messages, an identifier of one or more target municipal areas;

in response to receiving the plurality of messages, creating and storing third records that associate, for each message of the plurality of messages, the message with one or more target municipal areas;

receiving a request for messages from a user computing device;

in response to receiving the request for messages:
  determining a particular user account associated with the user computing device;
  determining, based on the first records and the second records, one or more particular municipal areas associated with the particular user account;
  determining, based on the third records, one or more particular messages from the plurality of messages, wherein each particular message is associated with at least one particular municipal area of the one or more particular municipal areas associated with the particular user account;
  causing delivering the one or more particular messages to the user computing device;

wherein the method is performed by one or more computing devices.

2. The method of claim 1, wherein the request is from a browser executing on the user computing device.

3. The method of claim 1, wherein the request is from a mobile application executing on the user computing device.

4. The method of claim 1, further comprising, prior to receiving the request for messages:
  based on the first records and the second records, creating and storing fourth records that associate one or more municipal areas with each user account;
  wherein determining the one or more particular municipal areas associated with the particular user account is based on the fourth records.

5. The method of claim 1, wherein creating and storing the second records comprises normalizing the digital data that defines the plurality of municipal areas.

6. The method of claim 1, further comprising:
  determining that one or more second particular message are not associated with at least one particular municipal area of the one or more particular municipal areas associated with the particular user account;
  determining that the one or more second particular message should not be delivered to the user computing device.

7. The method of claim 1, further comprising:
  storing, in a user geo database, the first records;
  storing, in a municipal areas database, the second records;
  storing, in a message/content database, the third records.

8. The method of claim 7, wherein determining the one or more particular municipal areas comprises executing a geo-spatial query on the user geo database and the municipal areas database.

9. A computer system comprising:
  one or more processors;
  a non-transitory computer-readable storage medium storing instructions which, when executed by the one or more processors, cause:
  using the storage medium, storing first records that associate user accounts with location information indicating, for each user account, a geographic location associated with the user account;
  receiving, from one or more municipal official computing devices, digital data that defines a plurality of municipal areas;
  in response to receiving the digital data, creating and storing second records that associate municipal area identifiers with sets of latitude/longitude values;
  receiving, from the one or more municipal official computing devices, a plurality of messages and, for each message of the plurality of messages, an identifier of one or more target municipal areas;
  in response to receiving the plurality of messages, creating and storing third records that associate, for each message of the plurality of messages, the message with one or more target municipal areas;
  receiving a request for messages from a user computing device;
  in response to receiving the request for messages:
    determining a particular user account associated with the user computing device;
    determining, based on the first records and the second records, one or more particular municipal areas associated with the particular user account;
    determining, based on the third records, one or more particular messages from the plurality of messages, wherein each particular message is associated with at least one particular municipal area of the one or more particular municipal areas associated with the particular user account;
    causing delivering the one or more particular messages to the user computing device.

10. The computer system of claim 9, wherein the request is from a browser executing on the user computing device.

11. The computer system of claim 9, wherein the request is from a mobile application executing on the user computing device.

12. The computer system of claim 9, the instructions when executed by the one or more processors, further causing, prior to receiving the request for messages:
  based on the first records and the second records, creating and storing fourth records that associate one or more municipal areas with each user account;
  wherein determining the one or more particular municipal areas associated with the particular user account is based on the fourth records.

13. The computer system of claim 9, wherein creating and storing the second records comprises normalizing the digital data that defines the plurality of municipal areas.

14. The computer system of claim 9, the instructions when executed by the one or more processors, further causing:
  determining that one or more second particular message are not associated with at least one particular municipal area of the one or more particular municipal areas associated with the particular user account;
  determining that the one or more second particular message should not be delivered to the user computing device.

15. The computer system of claim 9, the instructions when executed by the one or more processors, further causing:
  storing, in a user geo database, the first records;
  storing, in a municipal areas database, the second records;
  storing, in a message/content database, the third records.

16. The computer system of claim 15, wherein determining the one or more particular municipal areas comprises executing a geo-spatial query on the user geo database and the municipal areas database.

* * * * *